United States Patent
Perkins

(10) Patent No.: US 12,406,191 B2
(45) Date of Patent: Sep. 2, 2025

(54) SYSTEMS AND METHODS FOR REDUCING PROBLEMATIC CORRELATIONS BETWEEN FEATURES FROM MACHINE LEARNING MODEL DATA

(71) Applicant: Verizon Patent and Licensing Inc., Basking Ridge, NJ (US)

(72) Inventor: Kevin Perkins, Champaign, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 749 days.

(21) Appl. No.: 17/655,838

(22) Filed: Mar. 22, 2022

(65) Prior Publication Data

US 2023/0306280 A1    Sep. 28, 2023

(51) Int. Cl.
    *G06N 5/022* (2023.01)
(52) U.S. Cl.
    CPC ..................... *G06N 5/022* (2013.01)
(58) Field of Classification Search
    CPC ........................................................ G06N 5/022
    See application file for complete search history.

(56) References Cited

U.S. PATENT DOCUMENTS

| | | | | |
|---|---|---|---|---|
| 10,555,149 B2 * | 2/2020 | Hao | ........................ | G06N 5/01 |
| 11,900,238 B1 * | 2/2024 | Teig | ...................... | G06N 3/084 |
| 12,164,565 B2 * | 12/2024 | Sriharsha | ................ | G06N 20/00 |
| 2017/0099208 A1 * | 4/2017 | Wang | ...................... | H04L 69/16 |
| 2018/0032916 A1 * | 2/2018 | Sowani | .................. | G06N 20/00 |
| 2018/0234385 A1 * | 8/2018 | O'Neil | .................... | H04L 63/20 |
| 2019/0043068 A1 * | 2/2019 | Livne | ................. | G06Q 30/0205 |
| 2019/0279236 A1 * | 9/2019 | Fadli | .................. | G06Q 30/0201 |
| 2020/0410295 A1 * | 12/2020 | Baker | .................... | G06N 20/00 |
| 2021/0049349 A1 * | 2/2021 | Farokhi | ................. | G06V 20/10 |
| 2021/0312307 A1 * | 10/2021 | Hazard | .................. | G06N 5/022 |
| 2022/0198297 A1 * | 6/2022 | Ganguly | ............... | G06N 20/00 |

OTHER PUBLICATIONS

Malhotra, Shipra, and John Karanicolas. "A numerical transform of random forest regressors corrects systematically-biased predictions." arXiv preprint arXiv:2003.07445 (2020). (Year: 2020).*

* cited by examiner

*Primary Examiner* — Randall K. Baldwin

(57) ABSTRACT

A device may receive a structured dataset, a feature of the structured dataset, and a protected categorical dimension of the structured dataset, and may stratify the structured dataset into subsets by filtering the structured dataset based on the protected categorical dimension. The device may apply a quantile transform to data of the subsets, associated with the feature, to generate transformed subsets, and may combine the transformed subsets to generate a final dataset. The device may generate a training dataset for a machine learning model based on the final dataset, and may train the machine learning model with the training dataset to generate a trained machine learning model.

20 Claims, 9 Drawing Sheets

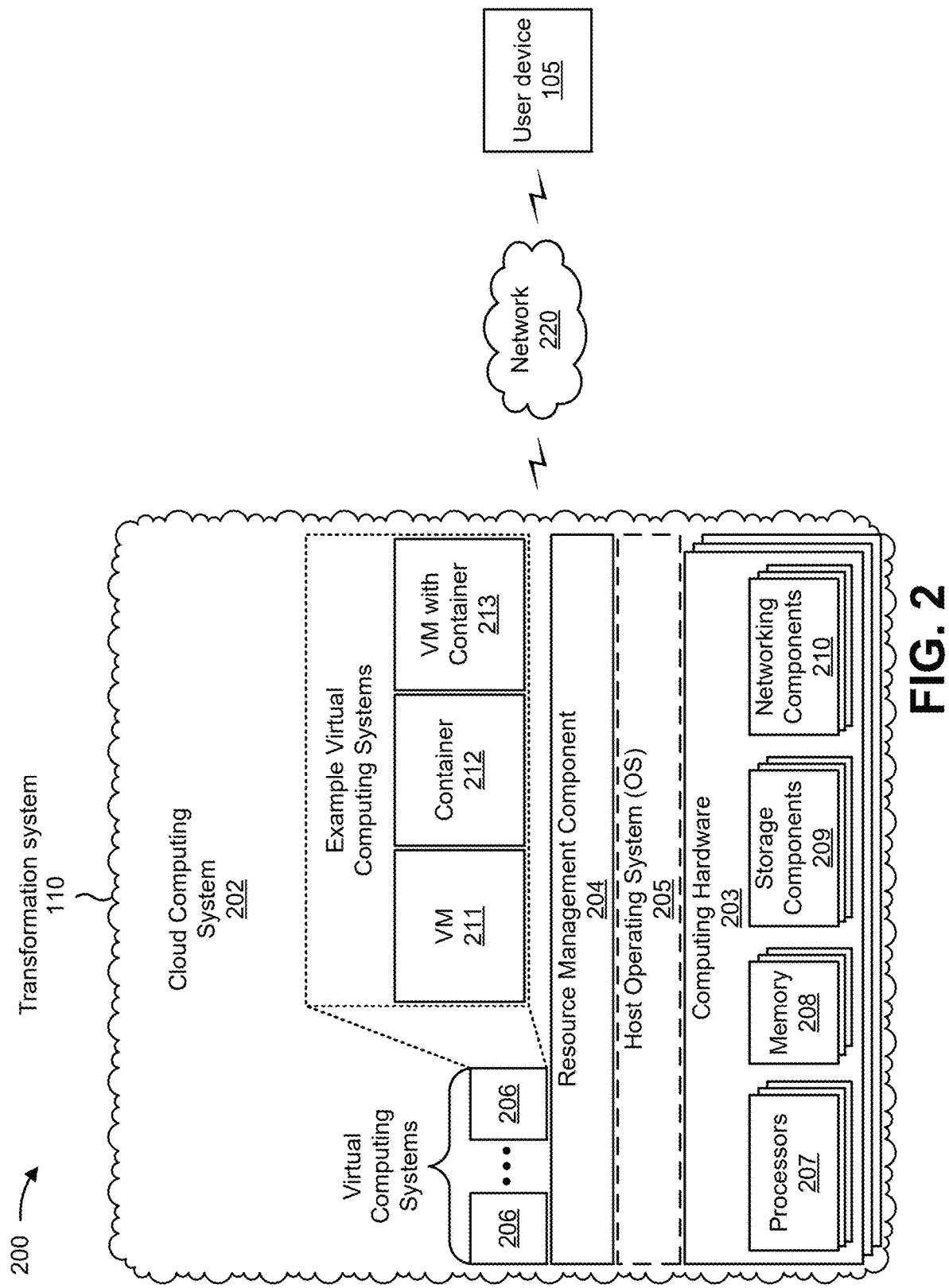

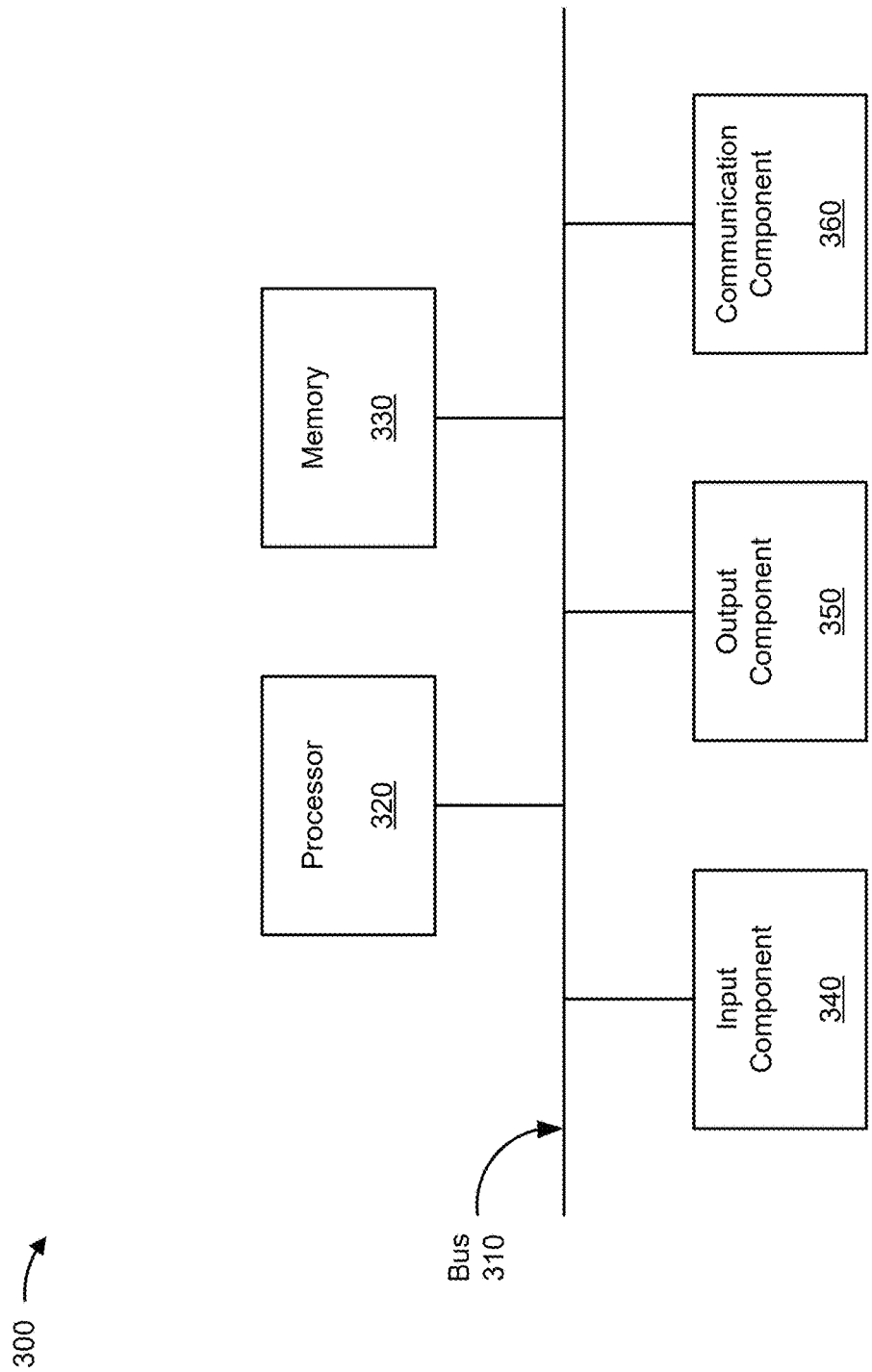

SYSTEMS AND METHODS FOR REDUCING PROBLEMATIC CORRELATIONS BETWEEN FEATURES FROM MACHINE LEARNING MODEL DATA

BACKGROUND

Machine learning models provide a tremendous value to businesses because such models may produce accurate predictions in a dynamic and scalable way. One of the costs of automated decision making via machine learning models is an effect of bias on protected dimensions (e.g., gender, race, and/or the like) associated with data processed by the machine learning models. For example, a machine learning model may generate suggestions, correlations, and/or predictions that are biased and may be useless.

BRIEF DESCRIPTION OF THE DRAWINGS

FIG. 2 is a diagram of an example environment in which systems and/or methods described herein may be implemented.

FIG. 3 is a diagram of example components of one or more devices of FIG. 2.

DETAILED DESCRIPTION OF EXAMPLE EMBODIMENTS

Figure 1A:
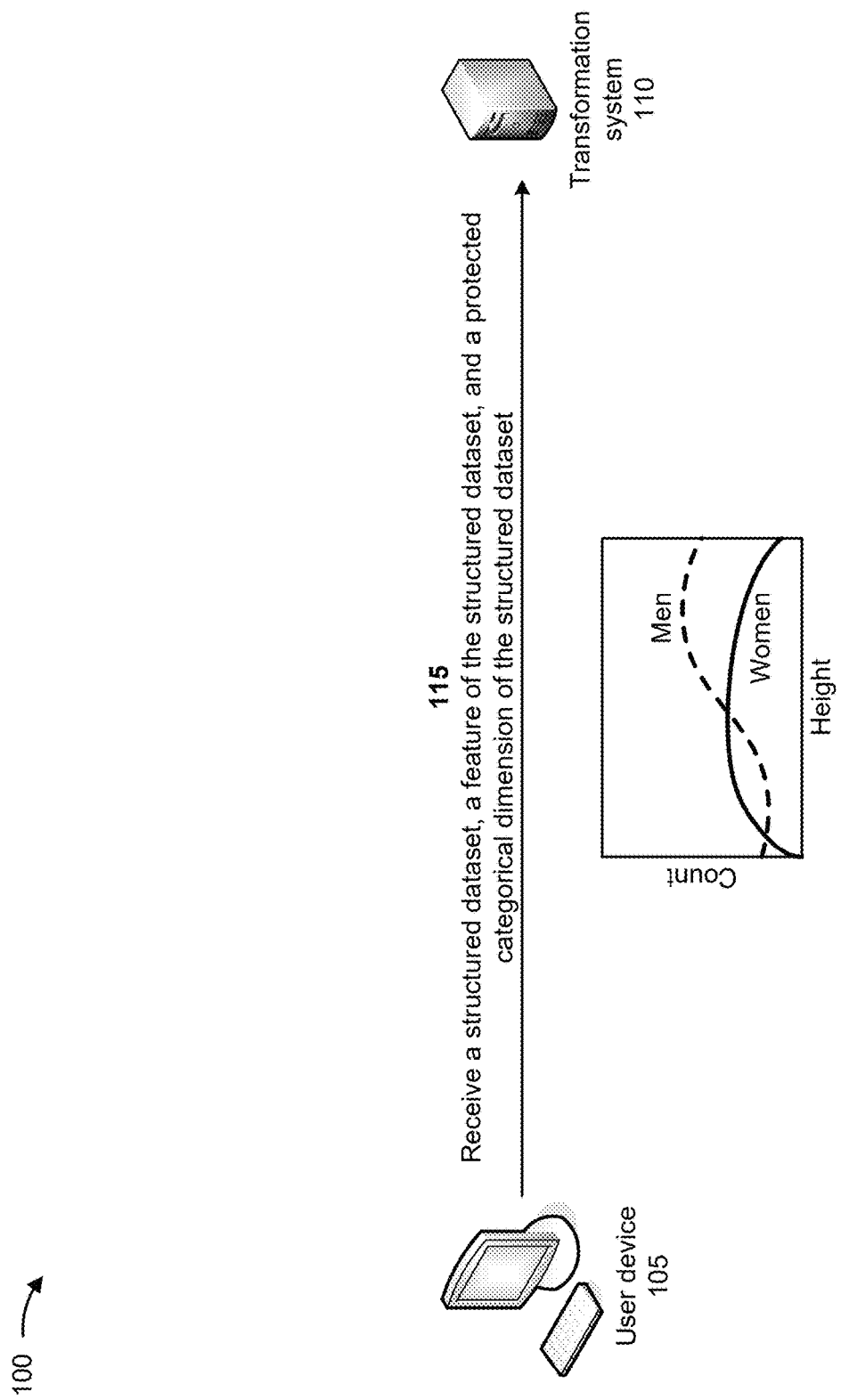
FIGS. 1A-1F are diagrams of an example implementation described herein.

The following detailed description of example implementations refers to the accompanying drawings. The same reference numbers in different drawings may identify the same or similar elements.

When businesses make automated decisions that may be based on biased predictions, the businesses may be exposed to legal and social consequences. It is challenging to produce unbiased machine learning models because many relevant features of data processed by the machine learning models correlate with the protected dimensions. Current techniques for producing unbiased machine learning models include reviewing every feature and rejecting features that may correlate with (e.g., act as a proxy for) a protected dimension. This all or nothing approach creates a sharp trade-off between machine learning model performance (e.g., reduction in the usefulness of suggestions, correlations, and/or predictions generated by the machine learning model) and machine learning model bias.

Thus, current techniques for producing unbiased machine learning models consume computing resources (e.g., processing resources, memory resources, communication resources, and/or the like), networking resources, and/or the like associated with generating biased results with a biased machine learning model, making incorrect business decisions based on the biased results, discovering and correcting the biased machine learning model, addressing legal actions based on the biased results, incorrectly training the machine learning model with biased data, and/or the like.

Some implementations described herein relate to a transformation system that reduces problematic correlations between features associated with bias or some other protected dimension (e.g., not to be used for prediction) associated with machine learning model data, via stratified quantile transformation. For example, the transformation system may receive a structured dataset, a feature of the structured dataset, and a protected categorical dimension of the structured dataset, and may stratify the structured dataset into subsets by filtering the structured dataset based on the protected categorical dimension. The transformation system may apply a quantile transform to data of the subsets, associated with the feature, to generate transformed subsets, and may combine the transformed subsets to generate a final dataset. The transformation system may generate a training dataset for a machine learning model based on the final dataset, and may train the machine learning model with the training dataset to generate a trained machine learning model.

In this way, the transformation system reduces problematic correlations between features associated with bias or some other protected dimension associated with machine learning model data, via stratified quantile transformation. The transformation system may maintain features in machine learning model data after preprocessing the features. The transformation system may apply a normalizing transform to features, in predefined groups, so that bias from the features is eliminated and some predictive power is retained. The transformation system may reduce a propensity of machine learning models to create predictions that are biased toward and/or against a protected dimension (e.g., race, ethnicity, gender, and/or the like). For example, features, such as income and zip code, often have high predictive power for machine learning models, but also correlate with protected dimensions, such as race. The transformation system may maintain all features, but may apply the normalizing transform to reduce racial correlation to zero (or near zero) for all features. The result is that bias can be reduced while maintaining high performance for machine learning models. This, in turn, conserves computing resources, networking resources, and/or the like that would otherwise have been consumed in generating biased results with a biased machine learning model, making incorrect business decisions based on the biased results, discovering and correcting the biased machine learning model, addressing legal actions based on the biased results, incorrectly training the machine learning model with biased data, and/or the like.

FIGS. 1A-1F are diagrams of an example 100 associated with reducing problematic correlations between features associated with bias or some other protected dimension associated with machine learning model data, via stratified quantile transformation. As shown in FIGS. 1A-1F, example 100 includes a user device 105 associated with a transformation system 110. Further details of the user device 105 and the transformation system 110 are provided elsewhere herein.

As shown in FIG. 1A, and by reference number 115, the transformation system 110 may receive a structured dataset, a feature of the structured dataset, and a protected categorical dimension of the structured dataset. For example, the transformation system 110 may receive the structured dataset, the feature of the structured dataset, and the protected categorical dimension of the structured dataset from the user device 105. In some implementations, the structured dataset may include two-dimensional, size-mutable, and heterogeneous tabular data (e.g., a pandas dataframe). The structured dataset may include labeled axes (e.g., rows and columns) and arithmetic operations may align on both row and column labels. The feature of the structured dataset may include a feature (e.g., income, geographical location, and/or the like)

with a high predictive power, but that also correlates with the protected categorical dimension (e.g., race, ethnicity, gender, and/or the like). The protected categorical dimension of the structured dataset may include a feature (e.g., race, ethnicity, gender, and/or the like) of the structured dataset that is highly biased but is to be retained in the structured dataset.

For example, as further shown in FIG. 1A, the structured dataset may include data associated with heights of men and women. The men are depicted by a dashed line and the women are depicted by a solid line. The x-axis correlates to the heights of the men and women, and the y-axis correlates to counts (e.g., quantities) of the men and women associated with the heights. In this example, the feature of the structured dataset may include incomes of the men and women and the protected categorical dimension of the structured dataset may include genders of the men and women.

Figure 1B:
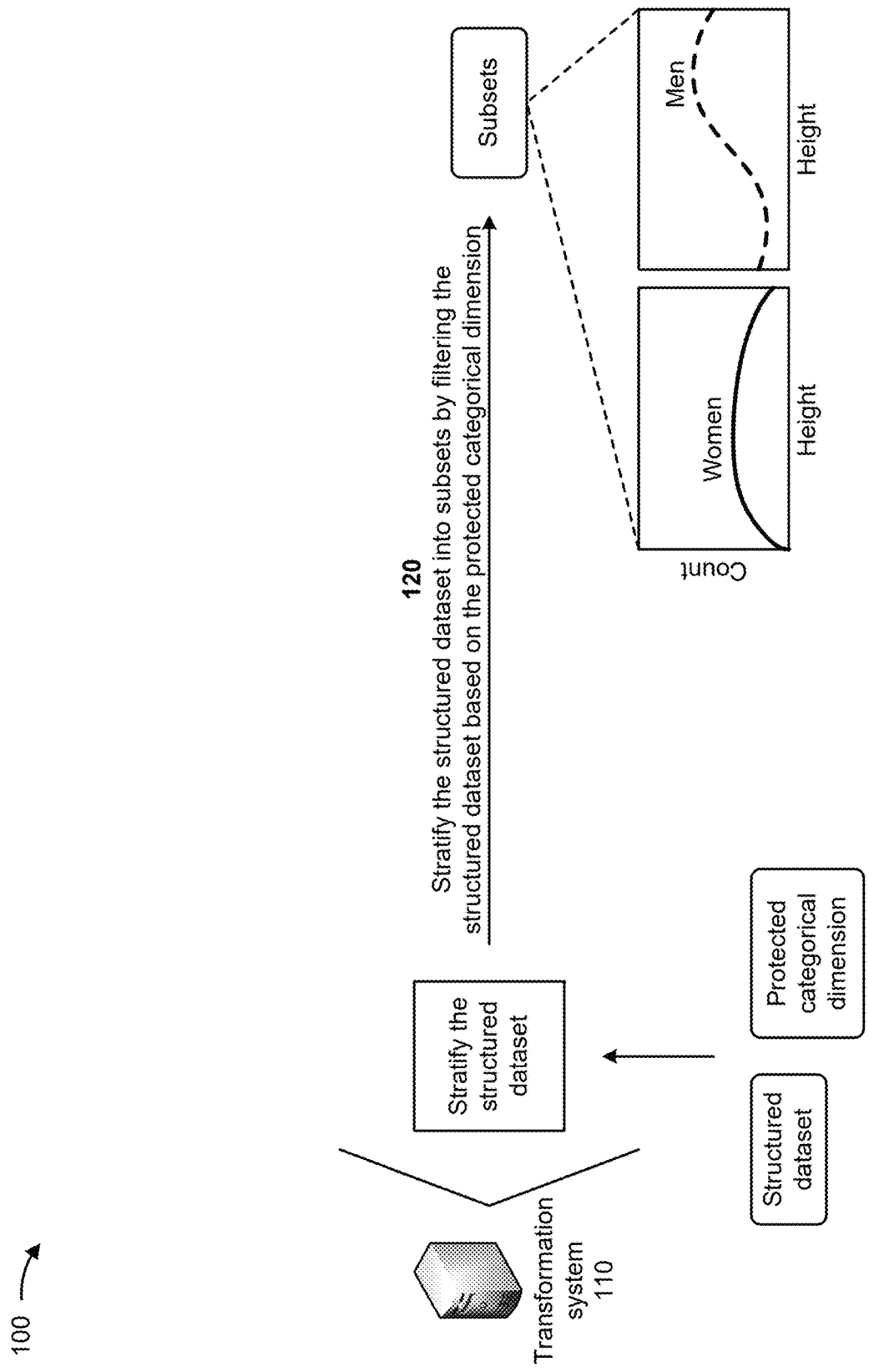

As shown in FIG. 1B, and by reference number 120, the transformation system 110 may stratify the structured dataset into subsets by filtering the structured dataset based on the protected categorical dimension. For example, the transformation system 110 may iterate through each data point, of the structured dataset, associated with the protected categorical dimension, and may create the subsets by filtering the structured dataset based on each data point, of the structured dataset, associated with the protected categorical dimension. Thus, the transformation system 110 may stratify or split the structured dataset into the subsets based on the protected categorical dimension. In some implementations, if multiple protected categorical dimensions are provided, the transformation system 110 may stratify the structured dataset into subsets by sequentially filtering the structured dataset based on each of the multiple protected categorical dimensions.

For example, as further shown in FIG. 1B, the transformation system 110 may split the structured dataset into two subsets, a subset for the men and a subset for the women. In some implementations, the transformation system 110 may split the structured dataset into more than two subsets based on the protected categorical dimension. For example, if the protected categorical dimension is ethnicity (e.g., Caucasian, Asian, African-American, Latino, and/or the like), the transformation system 110 may split the structured dataset into more than two subsets based on the protected categorical dimension.

Figure 1C:
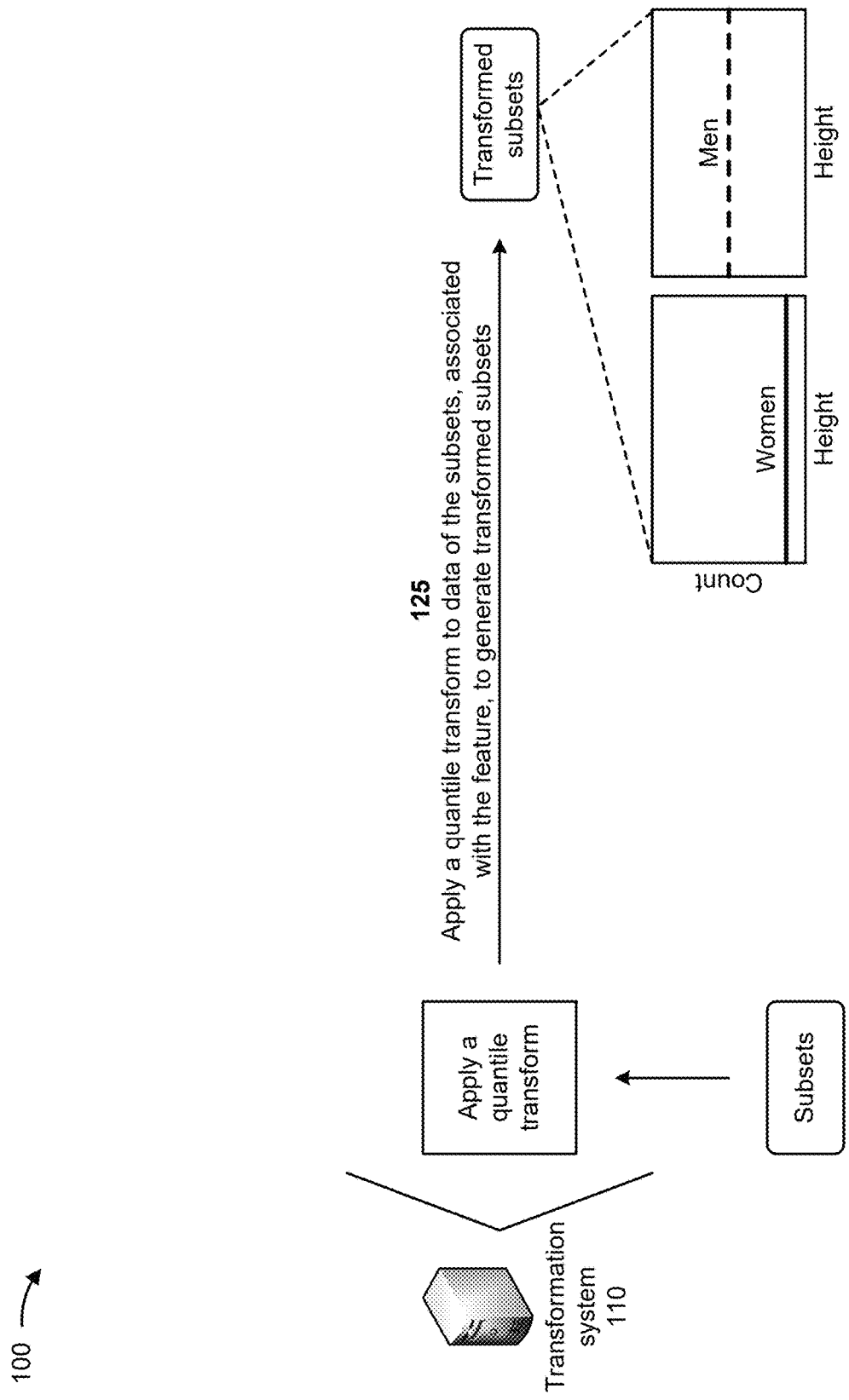

As shown in FIG. 1C, and by reference number 125, the transformation system 110 may apply a quantile transform to data of the subsets, associated with the feature, to generate transformed subsets. For example, numerical data may have a highly skewed or non-standard distribution due to outliers in the data, multi-modal distributions, highly exponential distributions, and/or the like. Many machine learning models perform better when numerical input data has a standard probability distribution, such as a Gaussian distribution or a uniform distribution. A quantile transform may transform numerical input data to a different data distribution which, in turn, can be used as input to a machine learning model. For example, the quantile transform may transform numerical input data or output data to have a Gaussian or a uniform probability distribution. The transformation system 110 may apply the quantile transform to the data of the subsets (e.g., associated with the feature) to transform the data of the subsets to have a Gaussian or a uniform probability distribution (e.g., which corresponds to the transformed subsets).

For example, as further shown in FIG. 1C, the transformation system 110 may apply the quantile transform to data of the subset for the men and the subset for the women, associated with the feature (e.g., the incomes of the men and women), to generate a transformed subset for the men and a transformed subset for the women. As shown, each of the transformed subset for the men and the transformed subset for the women may include an identical distribution (e.g., a Gaussian or a uniform distribution).

Figure 1D:
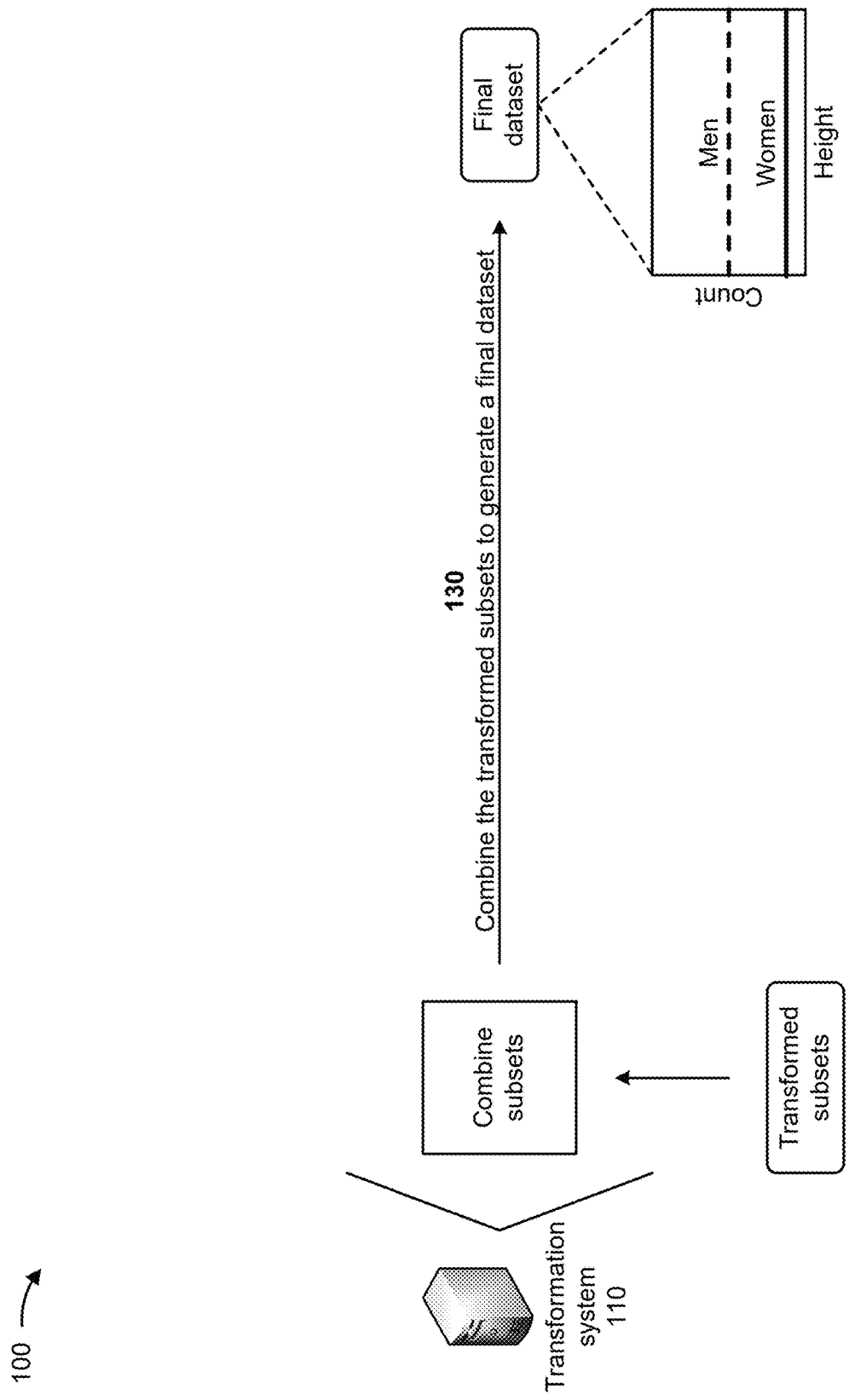

As shown in FIG. 1D, and by reference number 130, the transformation system 110 may combine the transformed subsets to generate a final dataset. For example, the transformation system 110 may combine (e.g., directly concatenate) the transformed subsets into a single structured dataset referred to as the final dataset. In some implementations, the transformation system 110 may append the transformed subsets to the structured dataset to generate the final dataset. As further shown in FIG. 1D, the transformation system 110 may merge the transformed subset for the men and the transformed subset for the women to generate the final dataset. Alternatively, or additionally, the transformation system 110 may append the transformed subset for the men and the transformed subset for the women, to the structured dataset, to generate the final dataset.

In some implementations, the transformation system 110 may utilize the following example syntax to generate the final dataset:

inputs: dataframe,
   biased_feature="income",
   protected_dimension="gender"
protected_dimension_values=dataframe[protected_dimension].unique( )
transformed_dataframes=[ ]
for dim in protected_dimension_values:
   subset=dataframe.query(protected_dimension=dim)
   biased_feature_subset=subset['biased_feature']
   subset['normalized_feature']=QuantileTransform(biased_feature_subset)
   transformed_dataframes.append(subset)
output=pandas.concat(transformed_dataframes).

Figure 1E:
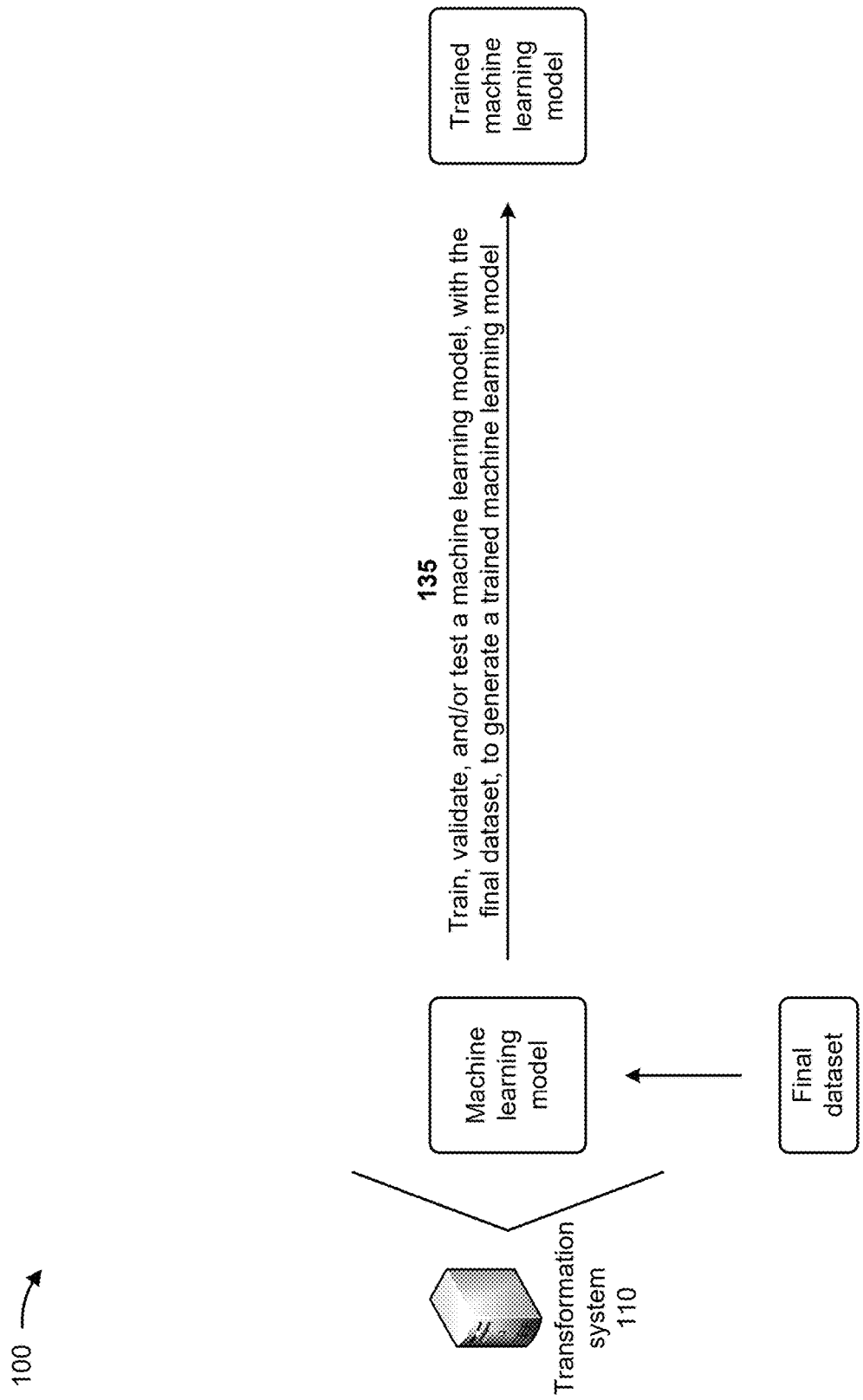

As shown in FIG. 1E, and by reference number 135, the transformation system 110 may train, validate, and/or test a machine learning model, with the final dataset, to generate a trained machine learning model. For example, the transformation system 110 may divide the final dataset into a first portion of final data, a second portion of final data, and a third portion of final data. The first portion, the second portion, and the third portion may include a same quantity of the final dataset, different quantities of the final dataset, and/or the like. In some implementations, more of the final dataset may be allotted to the first portion of final data since the first portion may be utilized to generate the training dataset for the machine learning model.

The transformation system 110 may generate a training dataset for the machine learning model based on the first portion of final data. The transformation system 110 may generate a validation dataset for the machine learning model based on the second portion of final data. The transformation system 110 may generate a test dataset for the machine learning model based on the third portion of final data. In other implementations, the transformation system 110 may utilize different portions of the final dataset to generate the training dataset, the validation dataset, and/or the test dataset for the machine learning model.

The transformation system 110 may train the machine learning model with the training dataset to generate the trained machine learning model. The machine learning model may be trained to process biased data and to predict unbiased results based on processing the biased data. In some implementations, rather than training the machine learning model, the transformation system 110 may obtain the trained machine learning model from another system or device that trained the machine learning model. In this case, the transformation system 110 may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the transformation system 110 may train the machine learning model with the training dataset to generate the trained machine learning model, and may process the validation dataset, with the trained machine learning model, to validate that the trained machine learning model is operating correctly. If the trained machine learning model is operating correctly, the transformation system 110 may process the trained machine learning model, with the test dataset, to further ensure that the trained machine learning model is operating correctly. A trained machine learning model can be said to be operating correctly if it has adequate accuracy, has adequate precision, has adequate recall, is not biased, and/or the like. If the trained machine learning model is operating incorrectly, the transformation system 110 may modify the trained machine learning model and may revalidate and/or retest the modified machine learning model based on the validation dataset and/or the test dataset.

Figure 1F:
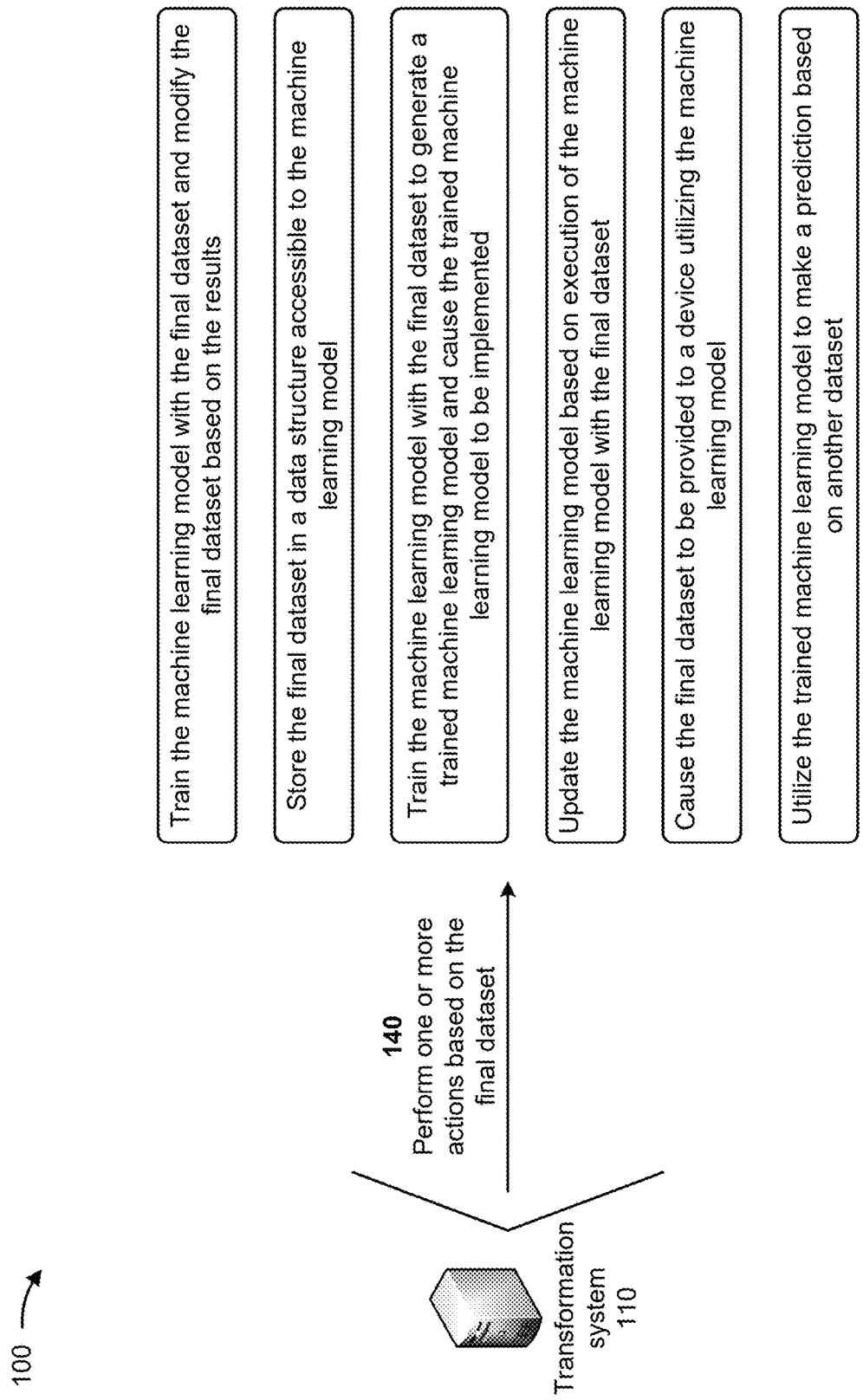

As shown in FIG. 1F, and by reference number 140, the transformation system 110 may perform one or more actions based on the final dataset. In some implementations, performing the one or more actions includes the transformation system 110 training the machine model with the final dataset to generate results and modifying the final dataset based on the results. For example, the transformation system 110 may train the machine learning model with the final dataset, and the machine learning model may produce predictions (e.g., results) based on training the machine learning model. The transformation system 110 may utilize the predictions to modify and improve the final dataset. In this way, the transformation system 110 conserves computing resources, networking resources, and/or the like that would otherwise have been consumed in generating biased results with a biased machine learning model, making incorrect business decisions based on the biased results, discovering and correcting the biased machine learning model, addressing legal actions based on the biased results, and/or the like.

In some implementations, performing the one or more actions includes the transformation system 110 storing the final dataset in a data structure accessible to the machine learning model. For example, the transformation system 110 may store the final dataset in a data structure so that the machine learning model (e.g., provided in the user device 105) may access and utilize the final dataset to train, validate, and/or test the machine learning model. In this way, the transformation system 110 conserves computing resources, networking resources, and/or the like that would otherwise have been consumed in generating biased results with a biased machine learning model, making incorrect business and technical decisions based on the biased results, discovering and correcting the biased machine learning model, incorrectly training the machine learning model with biased data, and/or the like.

In some implementations, performing the one or more actions includes the transformation system 110 training the machine learning model with the final dataset to generate a trained machine learning model and causing the trained machine learning model to be implemented. For example, the transformation system 110 may train the machine learning model with the final dataset and may cause the user device 105 to implement the trained machine learning model with real time data. The user device 105 may process the real time data, with the trained machine learning model, to make predictions. In this way, the transformation system 110 conserves computing resources, networking resources, and/or the like that would otherwise have been consumed in generating biased results with a biased machine learning model, making incorrect business decisions based on the biased results, addressing legal actions based on the biased results, incorrectly training the machine learning model with biased data, and/or the like.

In some implementations, performing the one or more actions includes the transformation system 110 updating the machine learning model based on execution of the machine learning model with the final dataset. For example, the transformation system 110 may process the final dataset with the machine learning model to generate predictions. The transformation system 110 may determine that the predictions are incorrect and may modify or update the machine learning model based on the incorrect predictions. In this way, the transformation system 110 conserves computing resources, networking resources, and/or the like that would otherwise have been consumed in generating biased results with a biased machine learning model, discovering and correcting the biased machine learning model, addressing legal actions based on the biased results, incorrectly training the machine learning model with biased data, and/or the like.

In some implementations, performing the one or more actions includes the transformation system 110 causing the final dataset to be provided to a device utilizing the machine learning model. For example, the transformation system 110 may provide the final dataset to the user device 105 utilizing the machine learning model. The user device 105 may train the machine learning model, with the final dataset, to generate the trained machine learning model. The user device 105 may process real time data, with the trained machine learning model, to make unbiased predictions. In this way, the transformation system 110 conserves computing resources, networking resources, and/or the like that would otherwise have been consumed in generating biased results with a biased machine learning model, making incorrect business decisions based on the biased results, discovering and correcting the biased machine learning model, and/or the like.

In some implementations, performing the one or more actions includes the transformation system 110 utilizing the trained machine learning model to make a prediction based on another dataset. For example, the transformation system 110 may receive another structured dataset, and may process the other structured dataset, with the trained machine learning model, to generate a prediction. The transformation system 110 may determine whether the prediction is unbiased and may utilize such a determination to evaluate the trained machine learning model. In this way, the transformation system 110 conserves computing resources, networking resources, and/or the like that would otherwise have been consumed in generating biased results with a biased machine learning model, making incorrect business decisions based on the biased results, incorrectly training the machine learning model with biased data, and/or the like.

In some implementations, the transformation system 110 may convert categorical data (e.g., zip code or geographical location data) to numerical data by calculating an event rate for each zip code when a target output is known. In some implementations, the transformation system 110 may utilize the numerical data for target customer advertising, modifying bandwidths of networks based on predictions, modifying data plans for networks, and/or the like. For example, the transformation system 110 may provide a model that predicts a single feature based on multiple categorical data. In some implementations, the transformation system 110 may not apply a limit on subsets of data that can be created, but may set a size threshold on the data in the subsets. If a subset has a small quantity of data points, the transformation system 110 may add random noise to the subset to provide a uniform transform for the subset. In some implementations, a subset may include a quantity of bins (e.g., divisions), and the transformation system 110 may automatically select a quantity of bins for a subset (e.g., ten bins in a subset). For example, the transformation system 110 may select a smaller quantity of bins when there is less data in a subset, and each bin may include a same quantity of data points.

In this way, the transformation system 110 reduces problematic correlations between features associated with bias or some other protected dimension associated with machine learning model data, via stratified quantile transformation. The transformation system 110 may maintain features in machine learning model data after preprocessing the features. The transformation system 110 may apply a normalizing transform to features, in predefined groups, so that bias from the features is eliminated and some predictive power is retained. The transformation system 110 may reduce a propensity of machine learning models to create predictions that are biased toward and/or against a protected dimension (e.g., race, ethnicity, gender, and/or the like). For example, features, such as income and zip code, often have high predictive power for machine learning models, but also correlate with protected dimensions, such as race. The transformation system 110 may maintain all features, but may apply the normalizing transform to reduce racial correlation to zero for all features. The result is that bias can be reduced while maintaining high performance for machine learning models. This, in turn, conserves computing resources, networking resources, and/or the like that would otherwise have been consumed in generating biased results with a biased machine learning model, making incorrect business decisions based on the biased results, discovering and correcting the biased machine learning model, addressing legal actions based on the biased results, incorrectly training the machine learning model with biased data, and/or the like.

As indicated above, FIGS. 1A-1F are provided as an example. Other examples may differ from what is described with regard to FIGS. 1A-1F. The number and arrangement of devices shown in FIGS. 1A-IF are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

FIG. 2 is a diagram of an example environment 200 in which systems and/or methods described herein may be implemented. As shown in FIG. 2, the environment 200 may include the transformation system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the transformation system 110 may include one or more elements 203-213 of the cloud computing system 202, may execute within the cloud computing system 202, and/or may be hosted within the cloud computing system 202, in some implementations, the transformation system 110 may not be cloud-based (e.g., may be implemented outside of a cloud computing system) or may be partially cloud-based. For example, the transformation system 110 may include one or more devices that are not part of the cloud computing system 202, such as a device 300 of FIG. 3, which may include a standalone server or another type of computing device. The transformation system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

FIG. 3 is a diagram of example components of a device 300, which may correspond to the transformation system 110 and/or the user device 105. In some implementations, the transformation system 110 and/or the user device 105 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
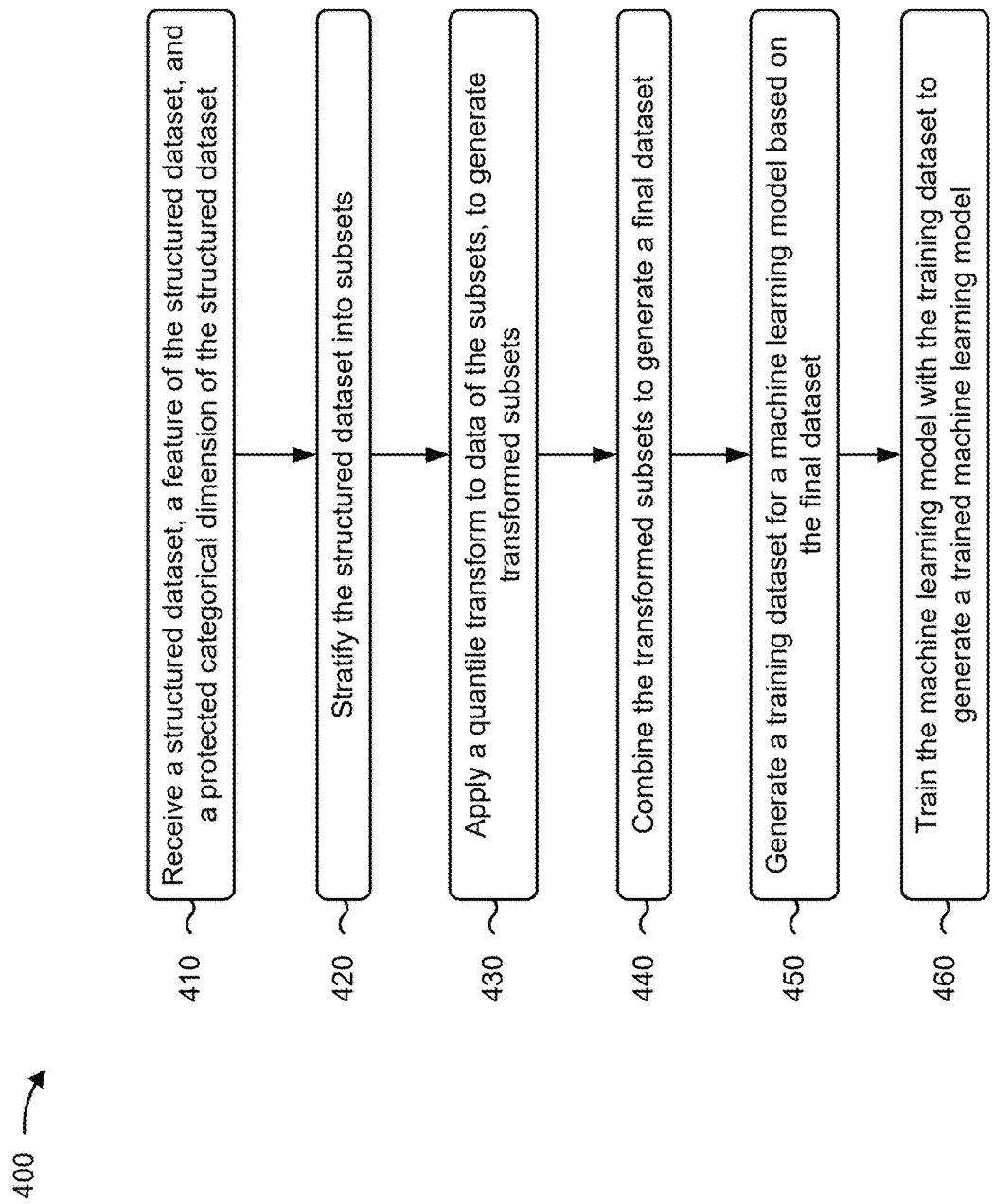
FIG. 4 is a flowchart of an example process for reducing problematic correlations between features associated with bias or some other protected dimension associated with machine learning model data, via stratified quantile transformation.

FIG. 4 is a flowchart of an example process 400 for reducing problematic correlations between features associated with bias or some other protected dimension associated with machine learning model data, via stratified quantile transformation. In some implementations, one or more process blocks of FIG. 4 may be performed by a device (e.g., the transformation system 110). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving a structured dataset, a feature of the structured dataset, and a protected categorical dimension of the structured dataset (block 410). For example, the device may receive a structured dataset, a feature of the structured dataset, and a protected categorical dimension of the structured dataset, as described above.

As further shown in FIG. 4, process 400 may include stratifying the structured dataset into subsets (block 420). For example, the device may stratify the structured dataset into subsets by filtering the structured dataset based on the protected categorical dimension, as described above.

As further shown in FIG. 4, process 400 may include applying a quantile transform to data of the subsets, to generate transformed subsets (block 430). For example, the device may apply a quantile transform to data of the subsets, associated with the feature, to generate transformed subsets, as described above. In some implementations, applying the quantile transform to the data of the subsets, associated with the feature, to generate the transformed subsets includes transforming the data of the subsets to have a Gaussian probability distribution or a uniform probability distribution.

As further shown in FIG. 4, process 400 may include combining the transformed subsets to generate a final dataset (block 440). For example, the device may combine the transformed subsets to generate a final dataset, as described above.

As further shown in FIG. 4, process 400 may include generating a training dataset for a machine learning model based on the final dataset (block 450). For example, the device may generate a training dataset for a machine learning model based on the final dataset, as described above.

As further shown in FIG. 4, process 400 may include training the machine learning model with the training dataset to generate a trained machine learning model (block 460). For example, the device may train the machine learning model with the training dataset to generate a trained machine learning model, as described above. In some implementations, the trained machine learning model is configured to generate unbiased predictions based on data that includes biased data. In some implementations, the machine learning model is trained to predict one of network bandwidth plan changes, a targeted bandwidth modification for a quantity of customers, or a targeted advertising campaign.

In some implementations, process 400 includes generating a validation dataset for the machine learning model based on the final dataset, and validating the machine learning model with the validation dataset. In some implementations, process 400 includes generating a test dataset for the machine learning model based on the final dataset, and testing the machine learning model with the test dataset. In some implementations, process 400 includes utilizing the trained machine learning model to make a prediction based on another dataset. In some implementations, process 400 includes storing the final dataset in a data structure accessible to the machine learning model.

In some implementations, process 400 includes causing the trained machine learning model to be implemented by a user device, wherein the user device is configured to utilize the trained machine learning model to predict unbiased results based on processing biased data. In some implementations, process 400 includes updating the machine learning model based on execution of the machine learning model with the final dataset. In some implementations, process 400 includes determining that one of the subsets includes a quantity of data less than a threshold quantity, and adding random noise to the one of the subsets based on determining that the one of the subsets includes the quantity of data less than the threshold quantity.

In some implementations, each of the subsets includes a quantity of bins and process 400 includes automatically selecting the quantity of bins for each of the subsets. In some implementations, when the structured dataset includes categorical data, process 400 includes calculating an event rate for the categorical data, and converting the categorical data to numerical data based on the event rate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a structured dataset, a feature of the structured dataset, and a protected categorical dimension of the structured dataset, wherein the structured dataset includes categorical data;
   stratifying, by the device, the structured dataset into subsets based on the protected categorical dimension;
   applying, by the device, a quantile transform to data of the subsets, to generate transformed subsets, wherein applying the quantile transform to the data of the subsets, to generate the transformed subsets, comprises:
      converting the categorical data to numerical data,
      adding random noise to one of the subsets based on a size threshold associated with the subsets, and
      automatically selecting a quantity of bins for each of the subsets;
   combining, by the device, the transformed subsets to generate a final dataset;
   generating, by the device, a training dataset for a machine learning model based on the final dataset;
   training, by the device, the machine learning model with the training dataset to generate a trained machine learning model to predict unbiased results based on processing biased data;
   executing the trained machine learning model with the final dataset to generate one or more predictions;
   determining that a prediction of the one or more predictions is incorrect; and
   updating the trained machine learning model based on the incorrect prediction.

2. The method of claim 1, wherein the machine learning model is trained to predict one of network bandwidth plan changes, a targeted bandwidth modification for a quantity of customers, or a targeted advertising campaign.

3. The method of claim 1, wherein applying the quantile transform to the data of the subsets, to generate the transformed subsets, further comprises:
   transforming the data of the subsets to have a Gaussian probability distribution or a uniform probability distribution.

4. The method of claim 1, further comprising:
   generating a validation dataset for the machine learning model based on the final dataset; and
   validating the machine learning model with the validation dataset.

5. The method of claim 1, further comprising:
   generating a test dataset for the machine learning model based on the final dataset; and
   testing the machine learning model with the test dataset.

6. The method of claim 1, further comprising:
   utilizing the trained machine learning model to make a prediction based on another dataset;
   determining whether the prediction based on the other dataset is unbiased; and
   utilizing the determination of whether the prediction based on the other dataset is unbiased to evaluate the trained machine learning model.

7. The method of claim 1, further comprising:
   storing the final dataset in a data structure accessible to the machine learning model.

8. The method of claim 1, wherein the trained machine learning model is configured to predict a single feature based on the categorical data.

9. The method of claim 1, wherein the method further comprises:
   calculating an event rate for the categorical data; and
   converting the categorical data to numerical data based on the event rate.

10. A device, comprising:
    one or more processors configured to:
       receive a structured dataset, a feature of the structured dataset, and a protected categorical dimension of the structured dataset;
       stratify the structured dataset into subsets by filtering the structured dataset based on the protected categorical dimension;
       apply a quantile transform to data of the subsets, associated with the feature, to generate transformed subsets, wherein applying the quantile transform to the data of the subsets, to generate the transformed subsets, comprises:
          adding random noise to one of the subsets based on a size threshold associated with the subsets;
       combine the transformed subsets to generate a final dataset;
       generate a training dataset for a machine learning model based on the final dataset;
       train the machine learning model with the training dataset to generate a trained machine learning model to generate unbiased predictions based on data that includes biased data;
       generate a validation dataset for the trained machine learning model based on the final dataset;
       validate the trained machine learning model with the validation dataset;
       cause the trained machine learning model to be executed by a user device, wherein the user device is configured to utilize the trained machine learning model to predict unbiased results based on processing real time data; and
       update the trained machine learning model based on the execution of the trained machine learning model with the real time data.

11. The device of claim 10, wherein the one or more processors are further configured to:
    update the machine learning model based on execution of the machine learning model with the final dataset.

12. The device of claim 10, wherein the one or more processors are further configured to:
    determine that one of the subsets includes a quantity of data less than a threshold quantity; and
    add the random noise to the one of the subsets based on determining that the one of the subsets includes the quantity of data less than the threshold quantity.

13. The device of claim 10, wherein each of the subsets includes a quantity of bins and the one or more processors are further configured to:
    automatically select the quantity of bins for each of the subsets.

14. The device of claim 10, wherein, when the structured dataset includes categorical data, the one or more processors are further configured to:
calculate an event rate for the categorical data; and
convert the categorical data to numerical data based on the event rate.

15. A non-transitory computer-readable medium storing a set of instructions, the set of instructions comprising:
one or more instructions that, when executed by one or more processors of a device, cause the device to:
receive a structured dataset, a feature of the structured dataset, and a protected categorical dimension of the structured dataset;
stratify the structured dataset into subsets by filtering the structured dataset based on the protected categorical dimension;
apply a quantile transform to data of the subsets, associated with the feature, to generate transformed subsets, wherein applying the quantile transform to the data of the subsets, to generate the transformed subsets, comprises:
adding random noise to one of the subsets based on a size threshold associated with the subsets;
combine the transformed subsets to generate a final dataset;
generate a training dataset for a machine learning model based on the final dataset;
train the machine learning model with the training dataset to generate a trained machine learning model to generate unbiased predictions based on data that includes biased data;
generate a test dataset for the trained machine learning model based on the final dataset;
test the trained machine learning model with the test dataset;
cause the trained machine learning model to be executed by a user device, wherein the user device is configured to utilize the trained machine learning model to predict unbiased results based on processing real time data; and
update the trained machine learning model based on the execution of the trained machine learning model with the real time data.

16. The non-transitory computer-readable medium of claim 15, wherein the one or more instructions, that cause the device to apply the quantile transform to the data of the subsets, associated with the feature, to generate the transformed subsets, cause the device to:
transform the data of the subsets to have a Gaussian probability distribution or a uniform probability distribution.

17. The non-transitory computer-readable medium of claim 15, wherein the one or more instructions further cause the device to:
utilize the trained machine learning model to make a prediction based on another dataset.

18. The non-transitory computer-readable medium of claim 15, wherein the one or more instructions further cause the device to:
determine that one of the subsets includes a quantity of data less than a threshold quantity; and
add random noise to the one of the subsets based on determining that the one of the subsets includes the quantity of data less than the threshold quantity.

19. The non-transitory computer-readable medium of claim 15, wherein each of the subsets includes a quantity of bins and the one or more instructions further cause the device to:
automatically select the quantity of bins for each of the subsets.

20. The non-transitory computer-readable medium of claim 15, wherein, when the structured dataset includes categorical data, the one or more instructions further cause the device to:
calculate an event rate for the categorical data; and
convert the categorical data to numerical data based on the event rate.

* * * * *